United States Patent
McGrew et al.

(10) Patent No.: US 10,666,640 B2
(45) Date of Patent: May 26, 2020

(54) SEMI-ACTIVE PROBING FRAMEWORK TO GATHER THREAT INTELLIGENCE FOR ENCRYPTED TRAFFIC AND LEARN ABOUT DEVICES

(71) Applicant: Cisco Technology, Inc., San Jose, CA (US)

(72) Inventors: David McGrew, Poolesville, MD (US); Blake Harrell Anderson, San Jose, CA (US); Subharthi Paul, San Jose, CA (US); William Michael Hudson, Jr., Cary, NC (US); Philip Ryan Perricone, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 210 days.

(21) Appl. No.: 15/848,645

(22) Filed: Dec. 20, 2017

(65) Prior Publication Data

US 2019/0190961 A1    Jun. 20, 2019

(51) Int. Cl.
*H04L 29/06* (2006.01)
*G06F 21/55* (2013.01)
(Continued)

(52) U.S. Cl.
CPC ........ *H04L 63/0823* (2013.01); *G06F 21/552* (2013.01); *G06F 21/554* (2013.01); *H04L 9/321* (2013.01); *H04L 63/02* (2013.01); *H04L 63/0428* (2013.01); *H04L 63/1408* (2013.01); *H04L 63/1416* (2013.01);
(Continued)

(58) Field of Classification Search
CPC . H04L 63/1408; H04L 63/1416; H04L 63/20; H04L 63/061; H04L 63/064; H04L 63/0823; H04L 63/02; H04L 63/306; H04L 63/1425; H04L 63/0428; H04L 63/166; H04L 67/141; H04L 9/321; G06F 21/552; G06F 21/554
See application file for complete search history.

(56) References Cited

U.S. PATENT DOCUMENTS 7,778,194 B1    8/2010  Yung
7,895,652 B2 *  2/2011  Kolton ............... H04L 63/1408
                                                       709/224
(Continued)

OTHER PUBLICATIONS

Anderson et al, "Identifying Encrypted Malware Traffic with Contextual Flow Data", Oct. 28, 2016, AISec '16: Proceedings of the 2016 ACM Workshop on Artificial Intelligence and Security, pp. 35-46.*

(Continued)

*Primary Examiner* — Ramy M Osman
(74) *Attorney, Agent, or Firm* — Behmke Innovation Group LLC; James M. Behmke; Jonathon P. Western

(57) ABSTRACT

In one embodiment, a device in a network observes traffic between a client and a server for an encrypted session. The device makes a determination that a server certificate should be obtained from the server. The device, based on the determination, sends a handshake probe to the server. The device extracts server certificate information from a handshake response from the server that the server sent in response to the handshake probe. The device uses the extracted server certificate information to analyze the traffic between the client and the server.

19 Claims, 12 Drawing Sheets

(51) Int. Cl.
*H04L 29/08* (2006.01)
*H04L 9/32* (2006.01)

(52) U.S. Cl.
CPC ........ *H04L 63/1425* (2013.01); *H04L 63/306* (2013.01); *H04L 67/141* (2013.01); *H04L 63/166* (2013.01)

(56) References Cited

U.S. PATENT DOCUMENTS

| | | | |
|---|---|---|---|
| 8,484,361 | B1 | 7/2013 | Hawthorne |
| 8,856,869 | B1 | 10/2014 | Brinskelle |
| 9,077,754 | B2 | 7/2015 | Gonuguntla et al. |
| 9,124,628 | B2 | 9/2015 | Shankar et al. |
| 9,407,644 | B1* | 8/2016 | Cheng ................. H04L 63/1408 |
| 10,063,591 | B1* | 8/2018 | Jiang ................... H04L 63/1416 |
| 10,397,006 | B2* | 8/2019 | Bowen |
| 2007/0180225 | A1* | 8/2007 | Schmidt .............. H04L 63/0823 713/152 |
| 2008/0043686 | A1* | 2/2008 | Sperti ................. H04L 63/1408 370/338 |
| 2009/0083537 | A1* | 3/2009 | Larsen ................ H04L 63/0823 713/153 |
| 2013/0081129 | A1* | 3/2013 | Niemela ............. H04L 63/0236 726/11 |
| 2014/0282957 | A1* | 9/2014 | Thakore .............. H04L 63/0823 726/7 |
| 2014/0359281 | A1* | 12/2014 | Saboori ............... H04L 63/0823 713/156 |
| 2016/0134646 | A1 | 5/2016 | Wing et al. |
| 2016/0330230 | A1* | 11/2016 | Reddy ................. H04L 63/0428 |
| 2016/0359823 | A1* | 12/2016 | Ayyadevara .......... H04L 63/061 |
| 2017/0163736 | A1* | 6/2017 | Jiang ..................... H04L 67/141 |
| 2017/0223054 | A1 | 8/2017 | Wing et al. |
| 2017/0317837 | A1* | 11/2017 | Alrawais ................. H04L 9/321 |
| 2018/0124085 | A1* | 5/2018 | Frayman ................ H04L 63/20 |
| 2018/0191691 | A1* | 7/2018 | Smith, III ........... H04L 63/1416 |
| 2018/0234256 | A1* | 8/2018 | Bowen .................. H04L 63/064 |
| 2018/0262347 | A1* | 9/2018 | Levy .................. H04L 63/0823 |
| 2019/0058714 | A1* | 2/2019 | Joshi .................. H04L 63/0823 |
| 2019/0182235 | A1* | 6/2019 | Raman ............... H04L 63/0823 |
| 2019/0190961 | A1* | 6/2019 | McGrew .............. H04L 63/1416 |

OTHER PUBLICATIONS

F. Andreasen et al.: "TLS 1.3 Impact on Network-Based Security," Oct. 30, 2017, Retrieved from the Internet: URL:https://tools.ietf.org/pdf/draft-camwinget-tls-use-cases-00.pdf.

International Search Report dated Mar. 6, 2019 in connection with PCT/US2018/064214.

* cited by examiner

SEMI-ACTIVE PROBING FRAMEWORK TO GATHER THREAT INTELLIGENCE FOR ENCRYPTED TRAFFIC AND LEARN ABOUT DEVICES

TECHNICAL FIELD

The present disclosure relates generally to computer networks, and, more particularly, to a semi-active probing framework to gather threat intelligence for encrypted traffic and learn about devices.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

Beyond the various types of legitimate application traffic in a network, some network traffic may also be malicious. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic include network traffic that propagate the malware itself and network traffic that passes control commands to already infected devices. However, many instances of malware now use encryption, to conceal their network activity from detection.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
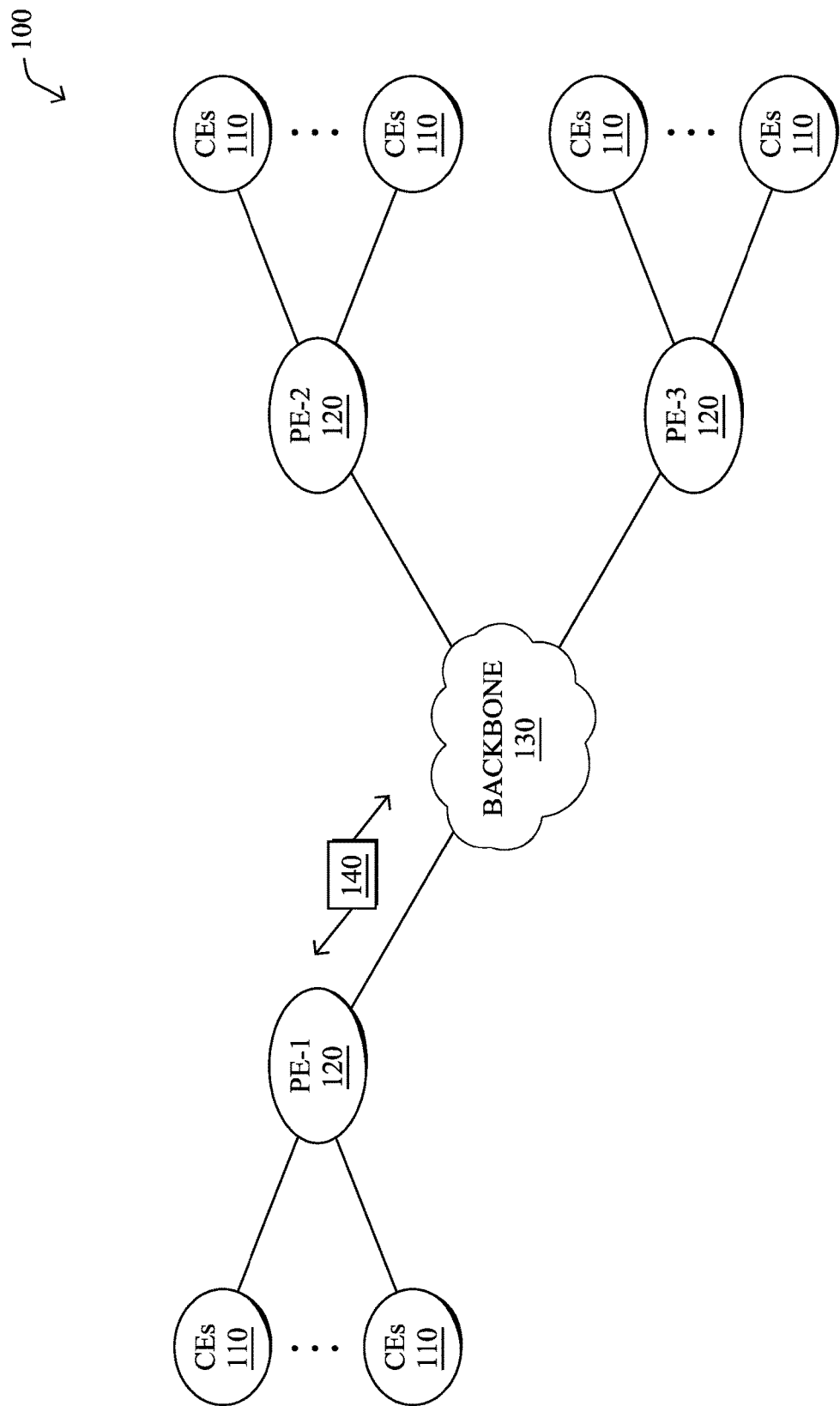
FIGS. 1A-1B illustrate an example communication network.

According to one or more embodiments of the disclosure, a device in a network observes traffic between a client and a server for an encrypted session. The device makes a determination that a server certificate should be obtained from the server. The device, based on the determination, sends a handshake probe to the server. The device extracts server certificate information from a handshake response from the server that the server sent in response to the handshake probe. The device uses the extracted server certificate information to analyze the traffic between the client and the server.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
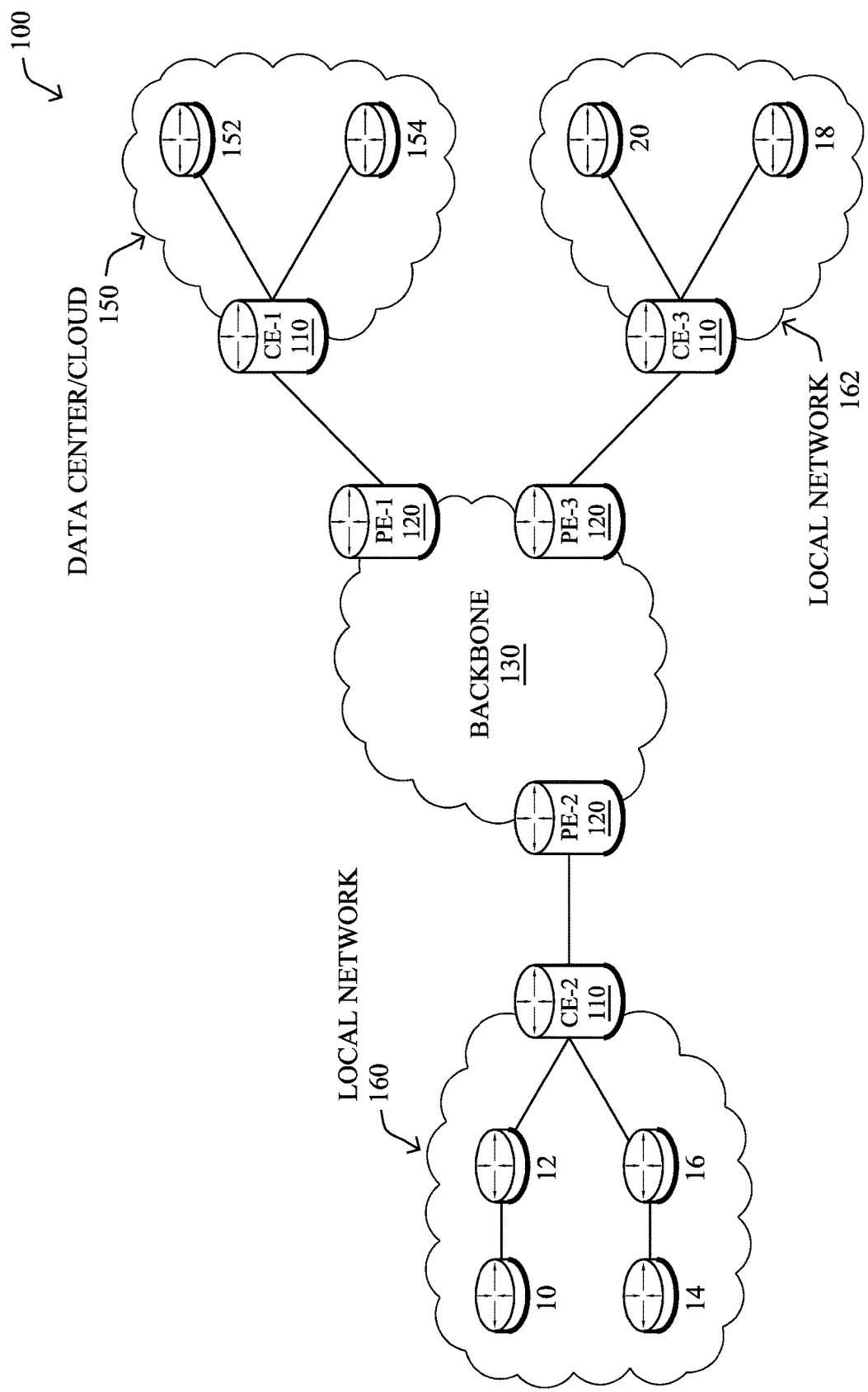

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
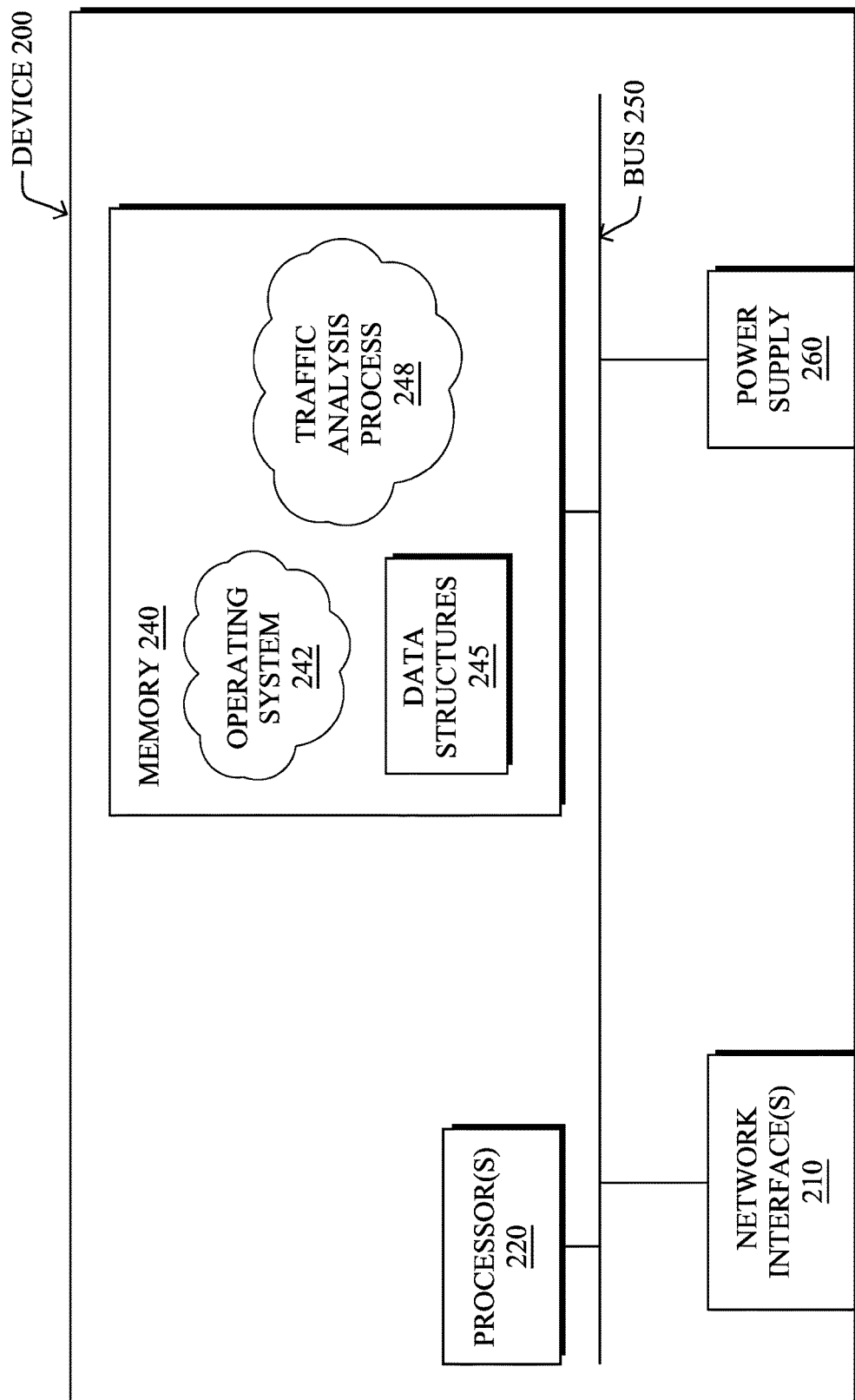
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify encrypted traffic in the network (and its originating application) for any number of purposes. In one embodiment, traffic analysis process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analysis process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Traffic analysis process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, traffic analysis 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
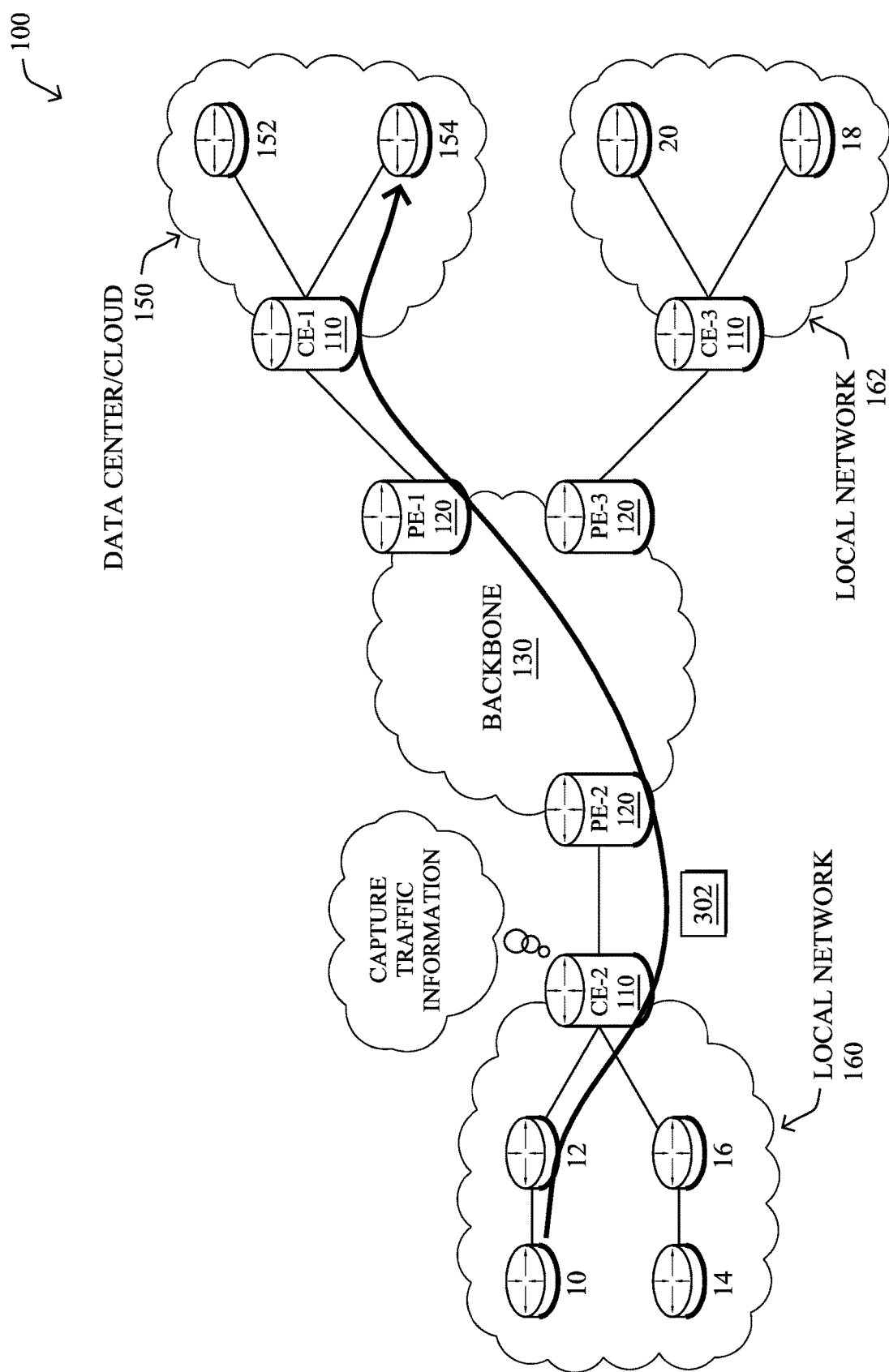
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions, etc., HTTP information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.). However, as would be appreciated, a traffic flow may also be encrypted, thus preventing the device from assessing the actual payload of the packet.

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, TLS information, SPLT data, inter-arrival times, and the like, provide a rich set of data that can be used for purposes of assessing network traffic. Notably, a malware classifier can be trained on this information to detect malicious traffic, even if the traffic is encrypted, with high recall, but sometimes at the cost of high precision. In another example, information about a client device can be discerned from analysis of its traffic, such as the operating system of the client, and the like.

However, there has been a recent push to conceal even more traffic information behind encryption. For example, in TLS version 1.3 and, presumably, subsequent versions of TLS, information such as the server certificate are now protected from access by intermediary devices. In other words, while these changes are intended to improve security for the encrypted session itself, these changes can also thwart attempts to determine whether the encrypted traffic is malicious (e.g., associated with malware, etc.).

Semi-Active Probing Framework to Gather Threat Intelligence for Encrypted Traffic and Learn about Devices The techniques herein introduce a probing approach that can be used to obtain certain information that can be used to analyze network traffic, even in the case in which the traffic is part of an encrypted session. For example, the probing can be performed to obtain information about the encryption mechanism itself (e.g., the server certificate used, etc.), which can be included as input to a traffic classifier, to determine whether the encrypted traffic between a client and server is malicious or to infer properties of the client, such as its operating system. In some aspects, the probing may be semi-active (e.g., conditional), thus allowing resources to be conserved in the network.

Specifically, according to one or more embodiments of the disclosure as described in detail below, a device in a network observes traffic between a client and a server for an encrypted session. The device makes a determination that a server certificate should be obtained from the server. The device, based on the determination, sends a handshake probe to the server. The device extracts server certificate information from a handshake response from the server that the server sent in response to the handshake probe. The device uses the extracted server certificate information to analyze the traffic between the client and the server.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein.

Figure 4:
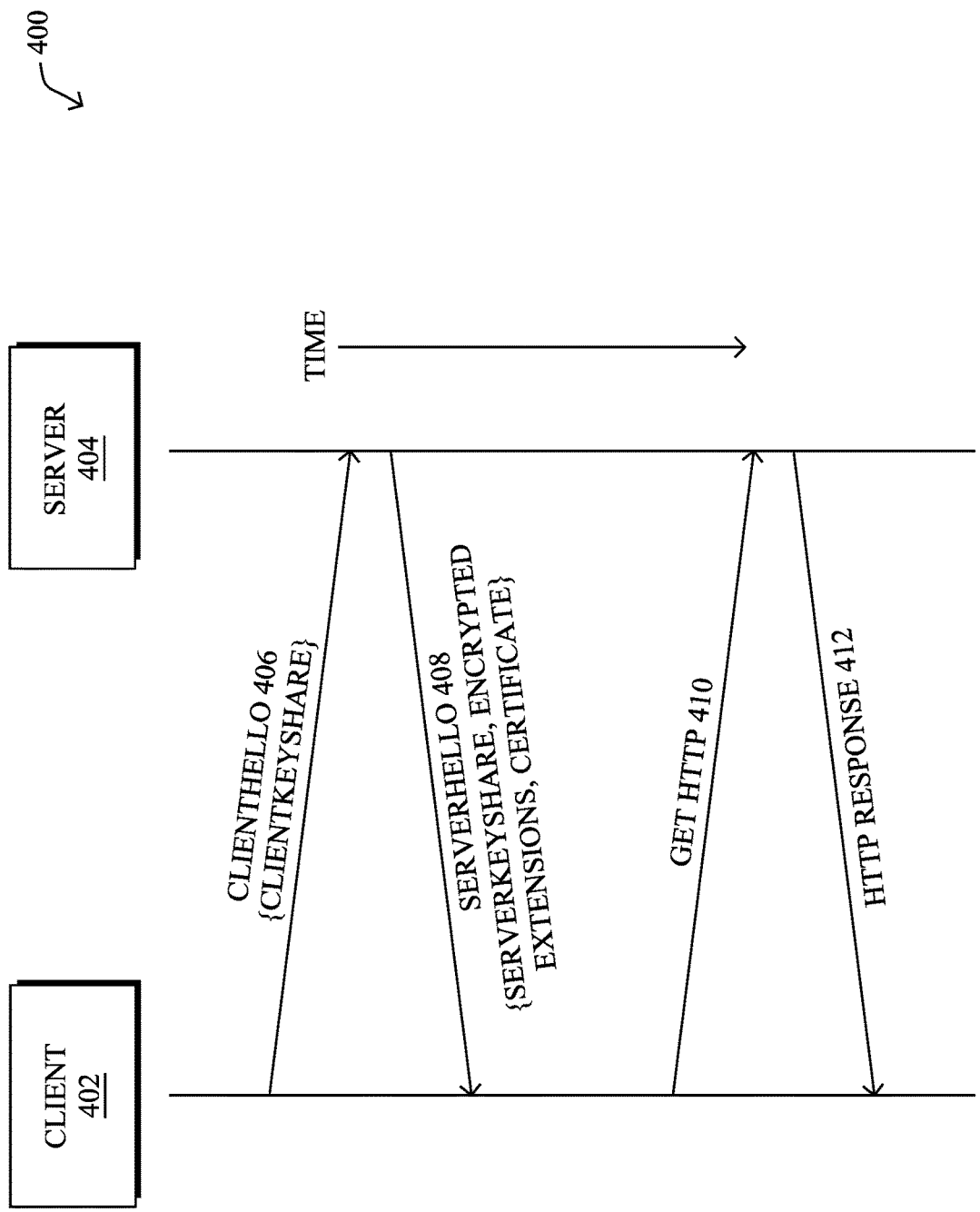
FIG. 4 illustrates an example encrypted session between a client and a server.

Operationally, FIG. 4 illustrates an example encrypted session 400 between a client 402 and a server 404. As shown, client 402 may begin by initiating a handshake with server 404 in which cryptographic information is first exchanged. This cryptographic information can then be used by client 402 and server 404, to encrypt subsequent messages between the two. In particular, client 402 may send a ClientHello message 406 to server 404, thereby signifying that client 402 wishes to establish an encrypted session with server 404. Note that, in some cases, client 402 and server 404 may first perform a SYN-ACK, to establish the TCP/IP connection via which ClientHello message 406 may be sent.

In various cases, ClientHello message 406 may include cryptographic keys for client 402 that can be used by server 404 to immediately begin encrypting the messages sent by server 404 back to client 402. This is the approach taken by some encryption mechanisms, such as TLS version 1.3. In prior versions of TLS, and in other schemes, the key exchange is performed only after an exchange of Hello messages.

In response to receiving ClientHello message 406, server 404 may generate and send a ServerHello message 408 back to client 402. Such a ServerHello message 408 may include the server key information for server 404, extensions, and the server certificate of server 404, which may be encrypted using the client keys sent by client 402 as part of ClientHello message 406. Client 402 can then use its own keys to decrypt ClientHello message 406 and begin encrypting its subsequent messages based on the information included in ServerHello message 408. For example, client 402 may use the server certificate included in ServerHello message 408 to authenticate server 404 and the server keys and extensions included in ServerHello message 408 to control the encryption of a GET HTTP message 410 sent by client 402 to server 404. In turn, server 404 can use the information that it obtained from the handshake, to encrypt an HTTP response message 412 sent to client 402 in response to message 410.

By virtue of performing the key exchange in conjunction with the Hello messages, the information that would otherwise be available to an intermediate device between client 402 and server 404, is now protected from access by that intermediate device. Thus, in the case of a traffic analyzer device, information such as the server certificate information from server 404 would be protected from access by the device. In doing so, this prevents the traffic analyzer device from leveraging this information to classify the traffic exchanged between client 402 and server 404, such as by making a malware assessment.

Figure 5:
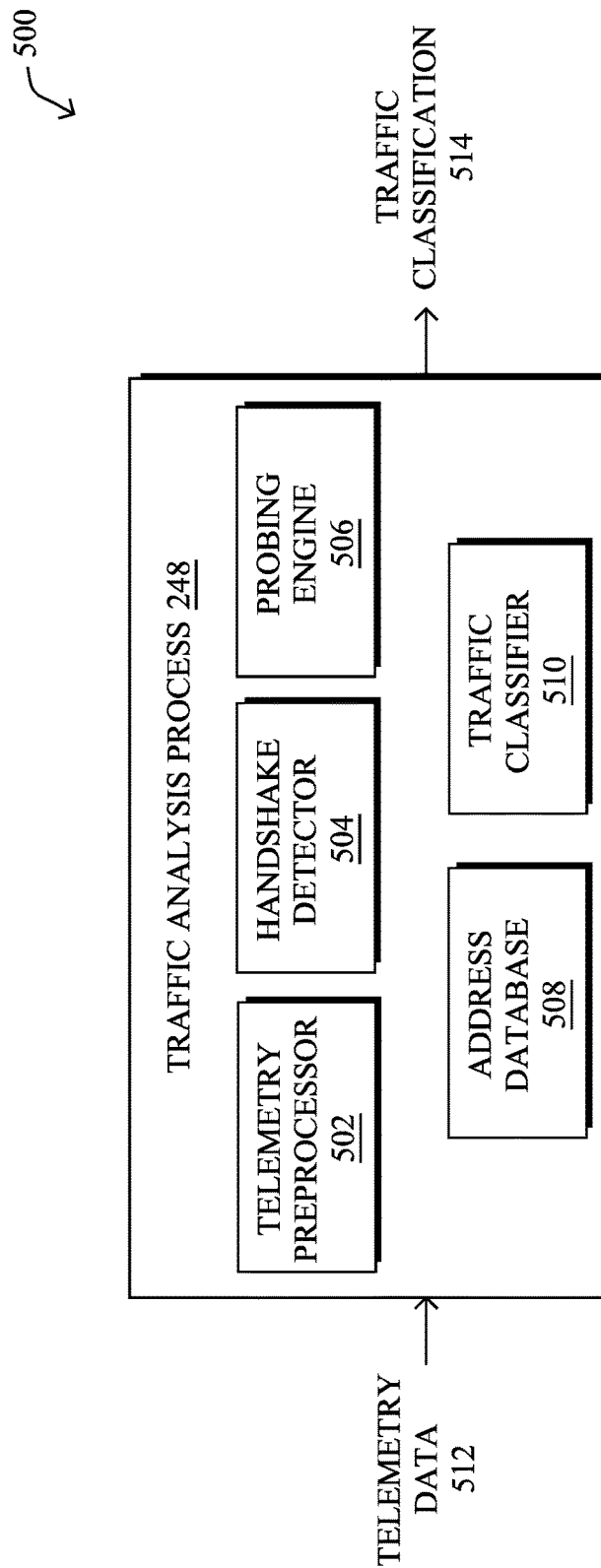
FIG. 5 illustrates an example architecture for performing traffic analysis with semi-active probing of server certificate information.

FIG. 5 illustrates an example architecture 500 for performing traffic analysis with semi-active probing of server certificate information, according to various embodiments. As shown, traffic analysis process 248 may include any number of sub-processes and/or may access any number of memory locations. As would be appreciated, these sub-processes and/or memory locations may be located on the same device or implemented in a distributed manner across multiple devices, the combination of which may be viewed as a single system/device that executes traffic analysis process 248. Further, while certain functionalities are described with respect to the sub-processes and memory locations, these functions can be added, removed, or combined as desire, in further implementations.

During operation, traffic analysis process 248 may observe the traffic in the monitored network through review of telemetry data 512 regarding the traffic. In some cases, the device hosting traffic analysis process 248 may collect telemetry data 512 directly, such as in the case of the traffic flowing through the hosting device. In other cases, however, the device hosting traffic analysis process 248 may observe the traffic in the network through collection of telemetry data 512 from any number of data collection nodes in the network, such as NetFlow or IPFIX exporters. Note that an IPFIX information element is equivalent to a data feature, as described herein, with the former term being used typically in the field of network telemetry and the latter term being used typically in the field of data science. In further embodiments, one or more of the features in telemetry data 512 may also be in a compressed form.

In some embodiments, traffic analysis process 248 may include a telemetry preprocessor 502 that preprocesses the incoming telemetry data 512 regarding the network traffic. For example, telemetry preprocessor 502 may convert telemetry data 512 into proper form for analysis, such as by converting telemetry data 512 into feature vectors. In the case in which telemetry data 512 is compressed, telemetry preprocessor 502 may first decompress the data.

Traffic analysis process 248 may also include a traffic classifier 510 that is configured to classify the traffic data from telemetry preprocessor 502 and output resulting traffic classification 514. For example, in the case of malware detection, traffic classifier 510 may be a machine learning-based classifier configured to discern between "malicious" and "benign" traffic, based on the observed characteristics of the traffic. In more complex implementations, traffic classifier 510 may be configured to assess whether the observed traffic is associated with a particular type of malware or family of malware. In yet another embodiment, traffic classifier 510 may be configured to infer information about a client or server involved in a communication, by classifying the traffic between the client and server. For example, the operating system of a client can be inferred through analysis of its network traffic. In some embodiment, traffic classifier 510 may comprise a number of classifiers configured to make different determinations based on the observed traffic.

Traffic analysis process 248 may include a handshake detector 504 that is configured to identify messages in the observed traffic that are involved in a cryptographic handshake. For example, handshake detector 504 may assess telemetry data 512, to identify when a client sends a ClientHello message to a server, as well as the ServerHello message sent back in response. Such information can be used by traffic analysis process 248 to control which classification is performed on the traffic data by traffic classifier 510 and, as detailed below, help trigger probing of the server, in some cases.

In various embodiments, traffic analysis process 248 may include a probing engine 506 configured to generate and send probes to servers, to capture information about the servers, such as their certificate information. More specifically, probing by probing engine 506 may entail initiating a handshake between the target server and the device executing probing engine 506. For example, in the case of TLS, probing engine 506 may send a ClientHello message to the target server, to capture the information sent by the server in its corresponding ServerHello message, such as its server certificate information. In turn, the information obtained by probing engine 506 (e.g., the handshake response data, etc.) can then be used as input to traffic classifier 510, to enhance the analysis of the network traffic.

In some embodiments, probing engine 506 may cache the information that it obtains from its probing in an address database 508. In turn, traffic analysis process 248 may use address database 508 to reduce the number of probes that probing engine 506 sends. Notably, if probing results for a given server are already exists in address database 508, such as based on a lookup of the address of the server, this information can be used by traffic classifier 510 to classify traffic between a given client and the server and without necessitating probing engine 506 sending a probe. Example information that may be stored in address database 508 may include, but is not limited to, handshake message lengths or sizes, server certificate information, extensions, and the like.

Various cases may trigger probing engine 506 to determine that it should send a probe to a server. In various embodiments, these cases may include any or all of the following:

1. Suspicious Traffic—In one embodiment, traffic classifier 510 may perform a preliminary assessment of the observed network traffic and determine that the traffic is potentially related to malware. If the traffic is related to an encrypted session (e.g., as determined by handshake detector 504) and its probability of being malicious (e.g., as determined by traffic classifier 510) is above a threshold, probing engine 506 may then send a probe to the server, to obtain its certificate information and other data that can be used by traffic classifier 510 for a more detailed analysis. In this case, probing engine 506 may send a ClientHello message that mimics that of the suspicious client, but instead including keys associated with the device executing probing engine 506.

2. Cache Entry Timeout—In another embodiment, probing engine 506 may send a probe to a server, based on a determination that the information for the server in address database 508 is stale. For example, probing engine 506 may periodically refresh the information in address database 508 (e.g., every n-number of hours, days, weeks, etc.) or may do so on demand from another process or command from an administrator.

3. Discrepancies—In further embodiments, probing engine 506 may probe a server, if there is a discrepancy between the observed traffic involving the server and the information stored in address database 508. For example, such a discrepancy may correspond to a size difference between the observed ServerHello message from the server to the client and the corresponding information captured previously for that server and stored in address database 508. In some embodiments, other discrepancies may lie in contextual flows associated with the handshakes, such as discrepancies in their related DNS flows. In another embodiment, a further discrepancy may be in the successfulness of the handshakes. For example, if the TLS handshake between the client and server fails, probing engine 506 may send a probe to the server, to verify that the handshake actually failed.

As noted, traffic classifier 510 can use the information obtained by probing engine 506 to assess the observed traffic in the network and output a traffic classification 514. Based on the resulting classification, the system can take any number of actions. For example, in the case of traffic classification 514 indicating the presence of malicious traffic, classification 514 can be used to cause the performance of a mitigation action, such as sending an alert to an administrator or security expert, sending an alert to the user of the client, blocking the malicious traffic, subjecting the traffic to additional scrutiny, or the like.

FIGS. 6A-6D illustrate examples of a traffic analyzer 604 performing semi-active probing of server certificate information, according to various embodiments. As shown, traffic analyzer 604 may be any device or service configured to analyze traffic between a client 602 and a server 606. For example, traffic analyzer 604 may implement architecture 500 described previously. In some cases, traffic analyzer 604 may be an intermediary device or service via which traffic between client 602 and server 606 flows. In other cases, traffic analyzer 604 may observe this traffic indirectly by receiving telemetry data regarding the traffic from one or more intermediary devices located along the path between client 602 and server 606.

For purposes of illustration, assume that client 602 sends a ClientHello message 608 to server 606, signifying that client 602 wishes to establish a secure session with server 606. In TLS version 1.3 and other similar protocols, message 608 may also include cryptographic key information that can be used by server 606 to encrypt its response. Based on its observation of the traffic exchanged between client 602 and server 606, traffic analyzer 604 may determine that message 608 is a ClientHello message intended to initiate a secure session.

Figure 6A:
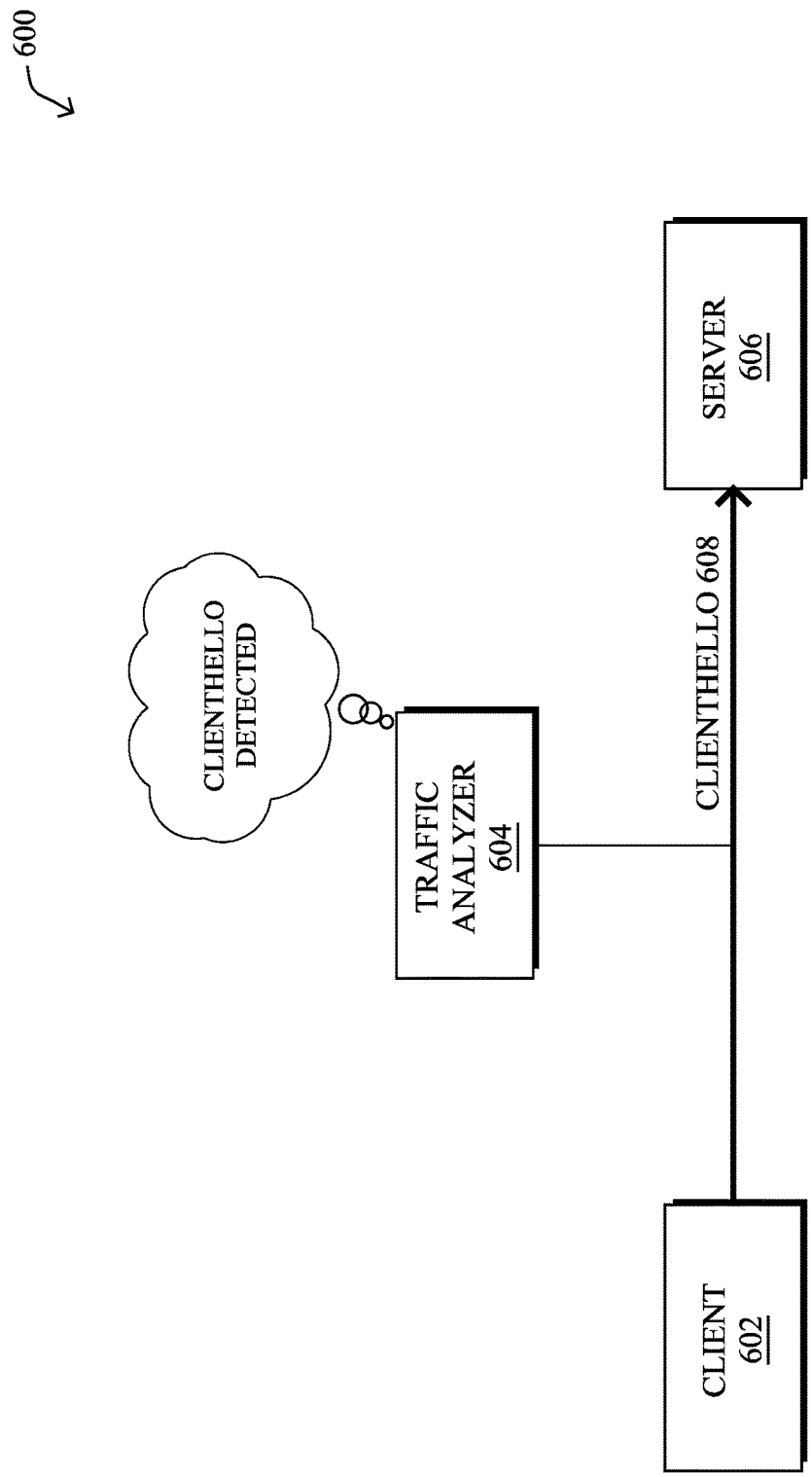
FIGS. 6A-6E illustrate examples of a traffic analyzer performing semi-active probing of server certificate information.
Figure 6B:
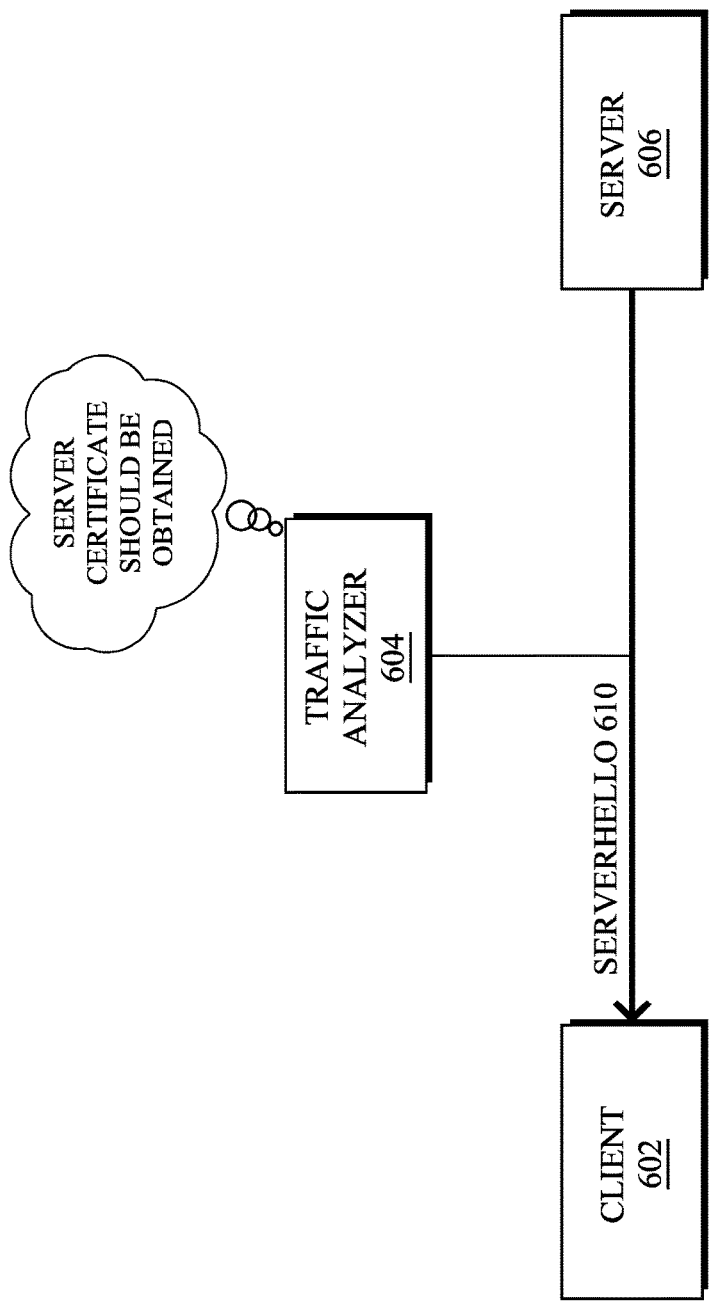

In FIG. 6B, server 606 may send a ServerHello message 610 back to client 602 and in response to ClientHello message 608 from client 602. However, as noted, the server certificate of server 606 may be protected from access by traffic analyzer 604 (e.g., encrypted using the keying information included in ClientHello message 608. In such a case, traffic analyzer 604 may make a determination as to whether it should probe server 606 itself, to obtain this certificate information. For example, if a preliminary assessment of the traffic associated with client 602, server 606, or a combination thereof, is suspected of being malicious, traffic analyzer 604 may determine that it should probe server 606. This may further be controlled based on the classification score (e.g., no probing may be necessary, if the traffic is already above a threshold probability of being malicious, etc.).

In other cases, if traffic analyzer 604 had previously probed server 606, it may still opt to re-probe server 606, such as when the cached server certificate information is out of date or traffic analyzer 604 detects a discrepancy between messages 608/610 and the cached information. For example, traffic analyzer 604 may opt to re-probe server 606, if the size of ServerHello message 610 is much larger or smaller than the ServerHello message previously sent to traffic analyzer 604 during probing of server 606. In yet further cases, traffic analyzer 604 may determine that it should probe server 606, if it detects discrepancies in the associated DNS messages, if server 606 does not respond to client 602 with ServerHello message 610, or the like.

Figure 6C:
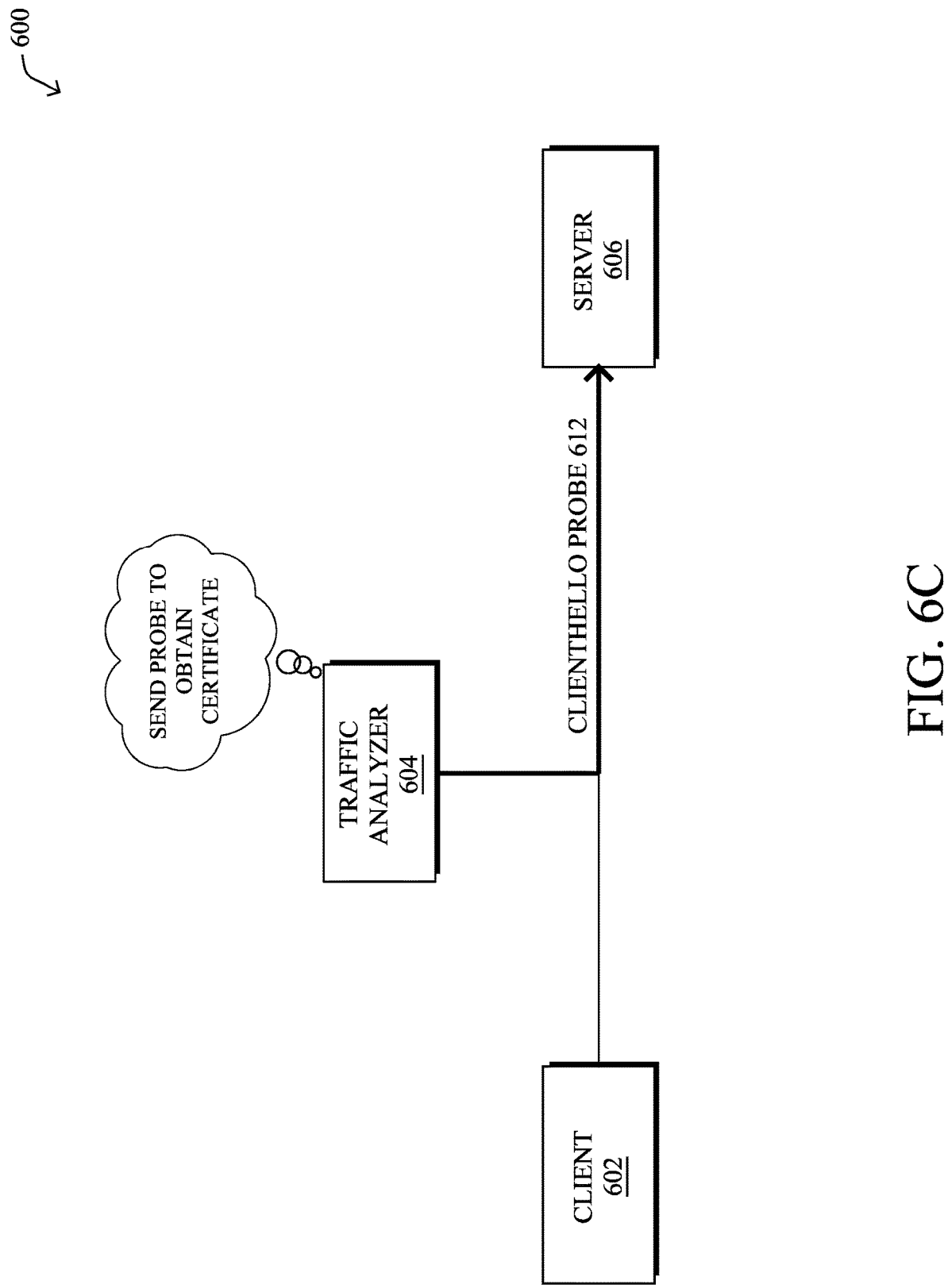

In FIG. 6C, traffic analyzer 604 may send a ClientHello probe message 612 to server 606, to obtain its server certificate information, as well as any other information that may be protected from purview in message 610. In various embodiments, ClientHello probe message 612 may mimic the ClientHello message 608 sent by client 602, to ensure that server 606 treats both client 602 and traffic analyzer 604 the same way. For example, ClientHello probe message 612 may use the same field parameters as that of ClientHello message 608, but with the key information of traffic analyzer 604, instead. Also, if server 606 behaves differently depending on the order in which it receives messages, then traffic analyzer 604 can send ClientHello probe message 602 before the actual one, or randomize the order of those messages.

Figure 6D:
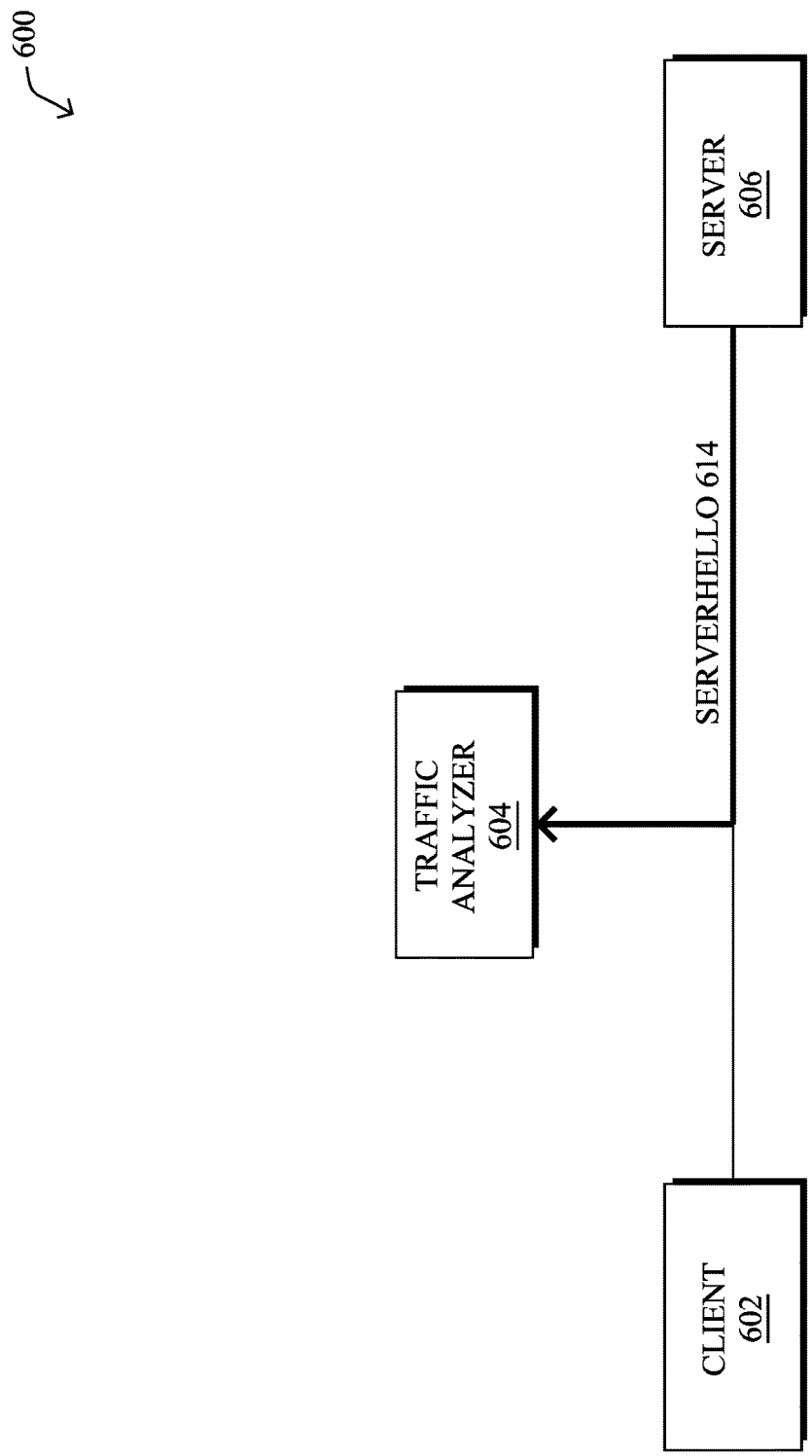
Figure 6E:
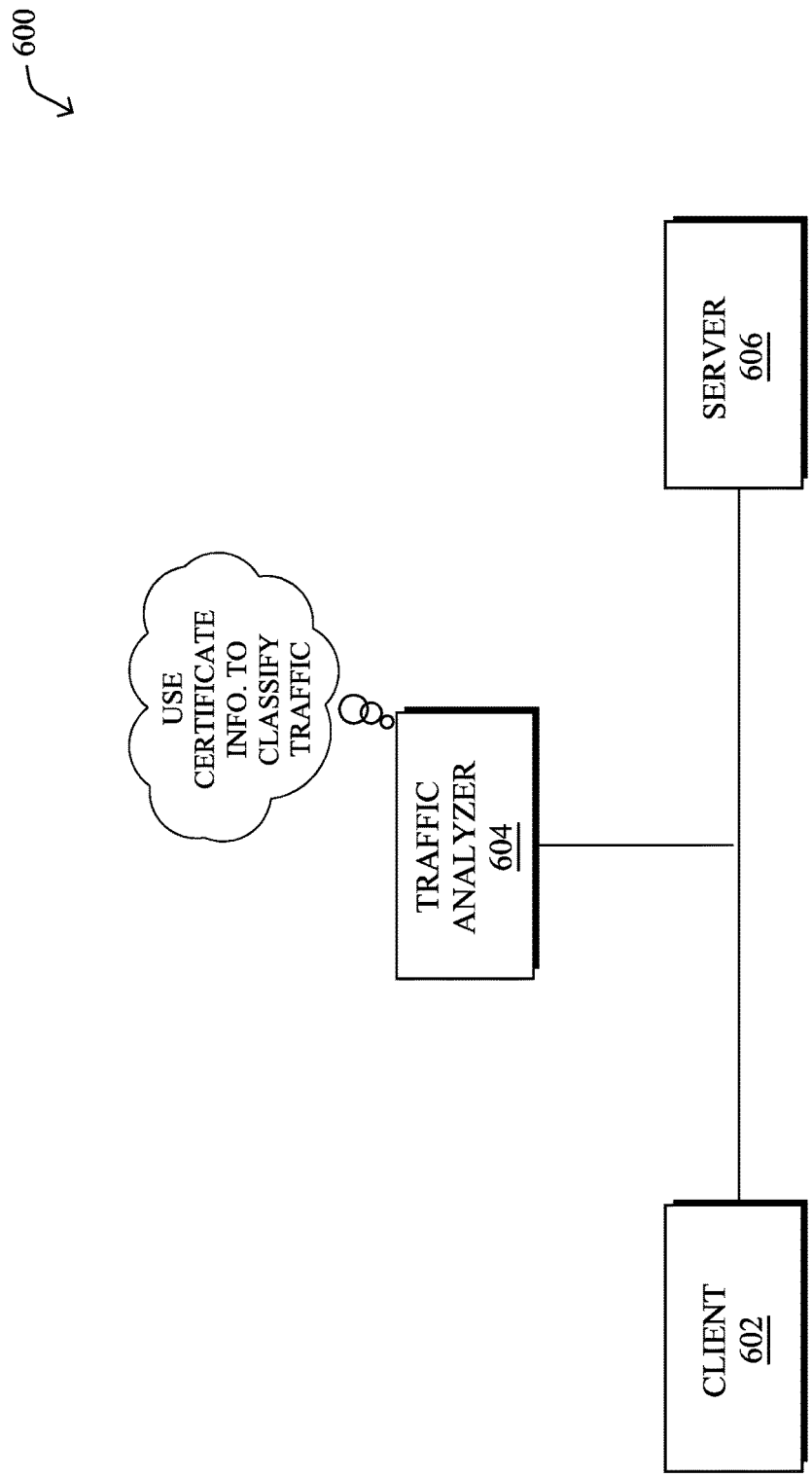

In FIG. 6D, server 606 may respond to ClientHello probe message 612 with a ServerHello message 614. In turn, traffic analyzer 604 can use its key information to decrypt ServerHello message 614 and obtain the server certificate of server 606, as well as any other information that may otherwise be protected from outside access. Then, as shown in FIG. 6E, traffic analyzer 604 can use this obtained information, in combination with other information (e.g., SPLT information, etc.), to classify the traffic between client 602 and server 606 and take any corrective measures, as necessary.

In further embodiments, once the handshake is finished, traffic analyzer 604 can also send a set of requests to understand the resources hosted on server 606, e.g., by sending one or more "GET/HTTP/1.1" messages. These requests can be generic, or predicted to be relevant for a specific server and observed traffic features. The data collected can be used for general threat intelligence, or it could be used as an orthogonal set of data features for a more advanced traffic classification. In other words, after performing the handshake with server 606, traffic analyzer 604 can perform application layer probing of server 606, to obtain further information that can be used to classify the traffic between client 602 and server 606.

For OS detection on a private network, the techniques herein could also be used by traffic analyzer 604 whenever a passive inference of the OS of client 602 gives an 'unknown' result. Because the logic used in crafting probe messages and in processing their responses can be complex and potentially changing over time, remote session injection can be used, so that a collector can implement that logic, while the observation point can be simple and static.

Figure 7:
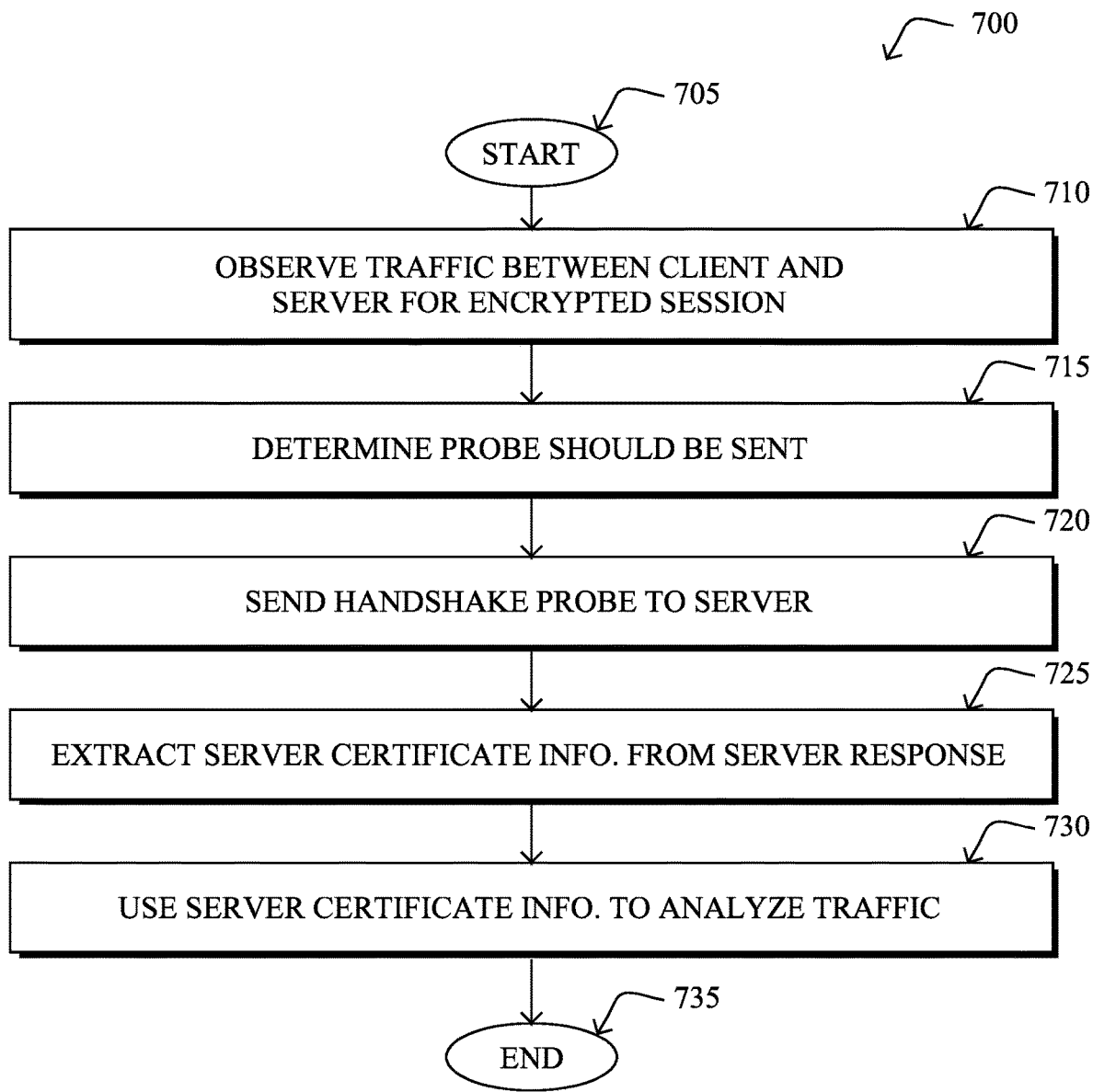
FIG. 7 illustrates an example simplified procedure for sending a probe to a server.

FIG. 7 illustrates an example simplified procedure for sending a probe to a server in a network, in accordance with one or more embodiments described herein. For example, a non-generic, specifically configured device (e.g., device 200) may perform procedure 700 by executing stored instructions (e.g., process 248). The procedure 700 may start at step 705, and continues to step 710, where, as described in greater detail above, the device may observer traffic between a client and a server for an encrypted session. For example, the observed traffic may include handshake messages, HTTP data messages, or the like. In various cases, the device may observe the traffic directly, such as when the traffic flows through the device. In other cases, the device may still observe the traffic indirectly, such as by receiving telemetry data regarding the traffic from one or more collectors in the network.

At step 715, as detailed above, the device may make a determination that a server certificate should be obtained from the server. Notably, the server certificate may be protected from access by the device, depending on the mechanism used to secure the traffic between the client and the server. Nevertheless, this information may be useful for purposes of analyzing the client-server traffic (e.g., malware detection, OS detection, etc.). In some embodiments, the device may determine that the certificate information should be obtained, based on a preliminary assessment of the maliciousness of the observed traffic. In another embodiment, the device may determine that the server certificate information should be obtained based on previously cached certificate information for the server being out of date, or that a discrepancy exists between the observed client-server traffic and the expected traffic. For example, a discrepancy may be a size discrepancy in handshake messages, a discrepancy in an associated domain name system (DNS) flows, a failed handshake between the client and the server, or the like. In another case, the device may simply determine that the server certificate information should be obtained via a scan of the Internet or a portion thereof.

At step 720, the device may send, based on the determination made in step 715, a handshake probe to the server, as described in greater detail above. In some cases, the device may mimic the observed handshake information sent by the client to the server, but with key information associated with the device. In other cases, the device may simply send a ClientHello or other handshake request to the server, to obtain its server certificate information and any other information available during the handshake exchange.

At step 725, as detailed above, the device may extract server certificate information from a handshake response from the server that the server sent in response to the handshake probe. For example, in the case in which the device sends a ClientHello message to the server that includes the device's key information, the device may use this key information to extract out the server's certificate information and/or any other information from a corresponding ServerHello sent back to the device.

At step 730, the device may use the extracted server certificate information to analyze the traffic between the client and the server, as described in greater detail above. For example, the device may use the server certificate information as input to a machine learning-based traffic classifier, potentially with other traffic characteristics as well, to determine whether the traffic between the client and the server is malicious. In turn, the device may trigger the performance of any number of mitigation actions in the network, such as sending alerts, blocking the traffic, etc. Procedure 700 then ends at step 735.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow a traffic analyzer to still obtain and use server certificate information for purposes of traffic classification, even in cases where this information would otherwise be protected from access. For example, in the case of TLS version 1.3, the techniques herein would allow the traffic analyzer to independently obtain the server certificate information, through handshake probing of the server. In further aspects, the traffic analyzer may only probe the server if a certain condition is met, so as to limit the impact of the probing on the performance of the network.

While there have been shown and described illustrative embodiments that provide for semi-active probing of a server, it is to be understood that various other adaptations and modifications may be made within the spirit and scope of the embodiments herein. For example, while certain embodiments are described herein with respect to using certain models for purposes of malware detection, the models are not limited as such and may be used for other functions, in other embodiments. In addition, while certain protocols are shown, such as TLS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    observing, by a device in a network, traffic between a client and a server for an encrypted session;
    making, by the device, a determination that a server certificate should be obtained from the server when the device determines that the traffic is potentially malicious;
    sending, by the device and based on the determination, a handshake probe to the server, wherein the handshake probe mimics a client hello message sent by the client to the server in the observed traffic;
    extracting, by the device, server certificate information associated with the encrypted session from a handshake response from the server that the server sent in response to the handshake probe; and
    using, by the device, the extracted server certificate information to analyze the traffic between the client and the server.

2. The method as in claim 1, wherein the traffic between the client and the server comprises a server certificate protected from access by the device.

3. The method as in claim 1, wherein the traffic is encrypted using Transport Layer Security (TLS).

4. The method as in claim 1, wherein using the extracted server certificate information to analyze the traffic between the client and the server comprises:
    using the extracted server certificate information as input to a machine learning-based traffic classifier.

5. The method as in claim 1, wherein making the determination that the server certificate should be obtained from the server comprises:

determining, by the device, that the traffic between the client and the server is potentially malicious, based on a preliminary assessment of the traffic.

6. The method as in claim 1, further comprising:
caching, by the device, the server certificate information in a database; and
using, by the device, the cached server certificate information to analyze subsequent traffic associated with the server.

7. The method as in claim 6, wherein making the determination that the server certificate should be obtained from the server comprises:
determining, by the device, that the cached server certificate information in the database is out of date.

8. The method as in claim 6, wherein making the determination that the server certificate should be obtained from the server comprises:
determining, by the device, that a discrepancy exists between the cached server certificate information and a server response sent from the server to the client.

9. The method as in claim 8, wherein the discrepancy comprises at least one of: a size discrepancy, a discrepancy in an associated domain name system (DNS) flow, or a failed handshake between the client and the server.

10. An apparatus, comprising:
one or more network interfaces to communicate with a network;
a processor coupled to the one or more network interfaces and configured to execute a process; and
a memory configured to store the process executable by the processor, the process when executed configured to:
observe traffic between a client and a server for an encrypted session;
make a determination that a server certificate should be obtained from the server when the apparatus determines that the traffic is potentially malicious;
send, based on the determination, a handshake probe to the server, wherein the handshake probe mimics a client hello message sent by the client to the server in the observed traffic;
extract server certificate information associated with the encrypted session from a handshake response from the server that the server sent in response to the handshake probe; and
use the extracted server certificate information to analyze the traffic between the client and the server.

11. The apparatus as in claim 10, wherein the traffic between the client and the server comprises a server certificate protected from access by the apparatus.

12. The apparatus as in claim 10, wherein the apparatus uses the extracted server certificate information to identify an operating system of the client.

13. The apparatus as in claim 10, wherein the apparatus uses the extracted server certificate information to analyze the traffic between the client and the server by:
using the extracted server certificate information as input to a machine learning-based traffic classifier.

14. The apparatus as in claim 10, wherein the apparatus makes the determination that the server certificate should be obtained from the server by:
determining that the traffic is potentially malicious, based on a preliminary assessment of the traffic.

15. The apparatus as in claim 10, wherein the process when executed is further configured to:
cache the server certificate information in a database; and
use the cached server certificate information to analyze subsequent traffic associated with the server.

16. The apparatus as in claim 15, wherein the apparatus makes the determination that the server certificate should be obtained from the server by:
determining that the cached server certificate information in the database is out of date.

17. The apparatus as in claim 15, wherein the apparatus makes the determination that the server certificate should be obtained from the server by:
determining that a discrepancy exists between the cached server certificate information and a server response sent from the server to the client, wherein the discrepancy comprises at least one of: a size discrepancy, a discrepancy in an associated domain name system (DNS) flow, or a failed handshake between the client and the server.

18. The apparatus as in claim 15, wherein the process when executed is further configured to:
send one or more application layer requests to the server, after extracting the server certificate information from the handshake response; and
use one or more responses to the one or more application layer requests to analyze the traffic between the client and the server.

19. A tangible, non-transitory, computer-readable medium storing program instructions that cause a device in a network to execute a process comprising:
observing, by the device, traffic between a client and a server for an encrypted session;
making, by the device, a determination that a server certificate should be obtained from the server when the device determines that the traffic is potentially malicious;
sending, by the device and based on the determination, a handshake probe to the server wherein the handshake probe mimics a client hello message sent by the client to the server in the observed traffic;
extracting, by the device, server certificate information associated with the encrypted session from a handshake response from the server that the server sent in response to the handshake probe; and
using, by the device, the extracted server certificate information to analyze the traffic between the client and the server.

* * * * *